US010705000B2

(12) United States Patent
Nagasue et al.

(10) Patent No.: US 10,705,000 B2
(45) Date of Patent: Jul. 7, 2020

(54) TOOL-LIFE DETERMINATION DEVICE (71) Applicant: FANUC CORPORATION, Yamanashi (JP)

(72) Inventors: Eiichirou Nagasue, Yamanashi (JP); Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 90 days.

(21) Appl. No.: 16/184,661

(22) Filed: Nov. 8, 2018

(65) Prior Publication Data

US 2019/0154557 A1    May 23, 2019

(30) Foreign Application Priority Data

Nov. 21, 2017    (JP) .................................. 2017-223959

(51) Int. Cl.
    *G01N 3/58*    (2006.01)
    *G01N 3/56*    (2006.01)
(52) U.S. Cl.
    CPC .................. *G01N 3/58* (2013.01); *G01N 3/56* (2013.01); *G01N 2203/0218* (2013.01)
(58) Field of Classification Search
    None
    See application file for complete search history.

(56) References Cited

U.S. PATENT DOCUMENTS

| 4,351,029 A | * | 9/1982 | Maxey | ...................... G01N 3/58 |
| | | | | 702/34 |
| 5,895,177 A | * | 4/1999 | Iwai | ...................... B23B 49/001 |
| | | | | 318/35 |

(Continued)

FOREIGN PATENT DOCUMENTS

| CN | 105643347 A | 6/2016 |
| JP | H04159060 A | 6/1992 |

(Continued)

OTHER PUBLICATIONS

Japanese Office Action dated Jul. 30, 2019, for Japanese Patent Application No. 2017223959.

(Continued)

*Primary Examiner* — Paul M. West
*Assistant Examiner* — Mark A Shabman
(74) *Attorney, Agent, or Firm* — Karceski IP Law, PLLC (57) ABSTRACT A tool-life determination device includes: a test-workpiece supporter having a cutting tool attached thereto, rotating the cutting tool, and supporting a test workpiece disposed in a processable range of the cutting tool of a working machine that performs a process while changing a relative position between the cutting tool and a workpiece; a load sensor disposed between the test-workpiece supporter and a base of the working machine fixed to an installation surface and detecting a load applied to the test workpiece; a storage unit storing a load pattern acting on the test workpiece and detected by the load sensor when the test workpiece is processed using a new cutting tool; and a determination unit determining an abrasion status of the cutting tool by comparing the load pattern with the load acting on the test workpiece at an appropriate timing during an actual process performed on the workpiece.

4 Claims, 10 Drawing Sheets (56) References Cited

U.S. PATENT DOCUMENTS

| | | | |
|---|---|---|---|
| 6,260,427 B1 * | 7/2001 | Jones | G01N 3/58 73/865.9 |
| 6,682,628 B2 * | 1/2004 | Hoffmann | B24B 37/013 156/345.13 |
| 2014/0236354 A1 | 8/2014 | Kamiya et al. | |
| 2016/0332273 A1 | 11/2016 | Furuya | |
| 2016/0332306 A1 | 11/2016 | Kamiya et al. | |
| 2017/0153208 A1 | 6/2017 | Kawai et al. | |
| 2018/0003603 A1 * | 1/2018 | Bellin | E21B 10/567 |

FOREIGN PATENT DOCUMENTS

| | | |
|---|---|---|
| JP | H0617826 U | 3/1994 |
| JP | H06-198547 A | 7/1994 |
| JP | 2007265237 A | 10/2007 |
| JP | 2010108085 A | 5/2010 |
| JP | 2010-234450 A | 10/2010 |
| JP | 2011041992 A | 3/2011 |
| JP | 2014163870 A | 9/2014 |
| JP | 2016215359 A | 12/2016 |
| JP | 3208873 U | 2/2017 |
| JP | 2017094463 A | 6/2017 |

OTHER PUBLICATIONS

Japanese Office Action dated Oct. 23, 2019, for Japanese Patent Application No. 2017-223959.

* cited by examiner

TOOL-LIFE DETERMINATION DEVICE

CROSS-REFERENCE TO RELATED APPLICATIONS

This application is based on and claims priority to Japanese Patent Application No. 2017-223959, filed on Nov. 21, 2017, the entire content of which is incorporated herein by reference.

FIELD OF THE INVENTION

The present invention relates to tool-life determination devices.

BACKGROUND OF THE INVENTION

A known breakage prediction method in the related art involves setting a cutting-tool breakage-risk torque level with a magnitude just prior to reaching breakage of a cutting tool from a cutting torque pattern obtained when a test workpiece is experimentally cut by using a new cutting tool, and comparing the set cutting-tool breakage-risk torque level with a cutting torque pattern detected when an actual workpiece is cut, so as to predict breakage of the cutting tool (for example, see Japanese Unexamined Patent Application, Publication No. Hei 6-198547).

In this breakage prediction method, the torque pattern is detected by disposing a torque sensor between a tool holder that supports the cutting tool and a motor that drives the tool.

SUMMARY OF THE INVENTION

The present invention provides the following solutions.

An aspect of the present invention provides a tool-life determination device including: a test-workpiece supporter that has a cutting tool attached thereto, rotates the cutting tool, and supports a test workpiece disposed in a processable range of the cutting tool of a working machine that performs a process while changing a relative position between the cutting tool and a workpiece; a load sensor that is disposed between the test-workpiece supporter and a base of the working machine fixed to an installation surface and that detects a load acting on the test workpiece; a storage unit that stores a load pattern acting on the test workpiece and detected by the load sensor when the test workpiece is processed using a new cutting tool; and a determination unit that determines an abrasion status of the cutting tool by comparing the load pattern stored in the storage unit with the load acting on the test workpiece and detected by the load sensor at an appropriate timing during an actual process performed on the workpiece.

DESCRIPTION OF EMBODIMENT(S) OF THE INVENTION

A tool-life determination device 1 according to an embodiment of the present invention will be described below with reference to the drawings.

Figure 1:
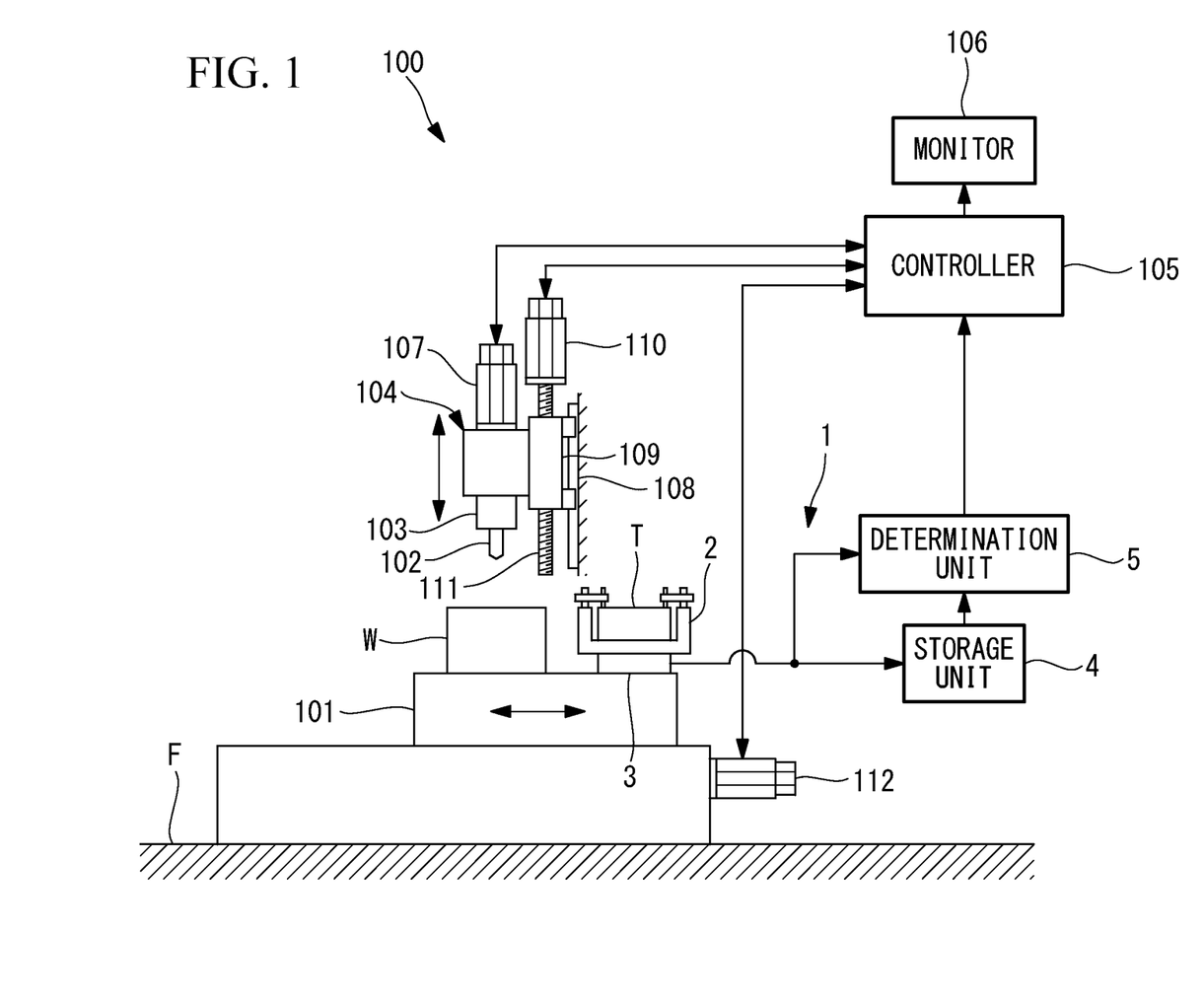
FIG. 1 is a block diagram illustrating a processing system including a tool-life determination device according to an embodiment of the present invention.

The tool-life determination device 1 according to this embodiment is to be used in a working machine 100 shown in FIG. 1.

The working machine 100 includes, for example, a stage (base) 101 that is installed on a floor surface (installation surface) F and that moves a workpiece W horizontally while securing the workpiece W, a processing head 103 that is disposed above the stage 101 and that rotationally drives a cutting tool 102 while supporting the cutting tool 102, an elevating shaft 104 that causes the processing head 103 to ascend and descend in the vertical direction, and a controller 105 that controls the processing head 103, the stage 101, and the elevating shaft 104. The controller 105 is connected to a monitor 106.

The processing head 103 causes the cutting tool 102 to be disposed such that the cutting edge thereof is oriented vertically downward.

In the drawings, reference signs 107, 108, 109, 110, and 111 respectively denote a motor that is provided in the processing head 103 and that generates a driving force for rotationally driving the cutting tool 102, a linear guide that constitutes the elevating shaft 104, a slider supported by the linear guide 108 in an ascendable/descendible manner, a motor that generates a driving force, and a ball screw that causes the slider 109 to ascend and descend by means of the motor 110. Furthermore, reference sign 112 denotes a motor that generates a driving force for driving the stage 101.

The tool-life determination device 1 according to this embodiment includes: a test-workpiece supporter 2 that is disposed on a part of the stage 101, which secures the workpiece W of the working machine 100, and that supports a test workpiece T; a load sensor 3 disposed between the test-workpiece supporter 2 and the stage 101; a storage unit 4 that stores a load pattern detected by the load sensor 3 when the test workpiece T is processed in a state where a new cutting tool 102 is attached; and a determination unit 5 that determines the abrasion status of the cutting tool 102 by comparing a load, which is detected when the test workpiece T is processed at an appropriate timing during a process performed on the workpiece W, with the load pattern stored in the storage unit 4.

The test workpiece T is, for example, a rectangular metal block. The test-workpiece supporter 2 supports the test workpiece T such that one surface thereof is disposed orthogonally to the axis of the cutting tool 102. In an example shown in FIG. 2, the test-workpiece supporter 2 includes a support body 6 having a mount surface 6a on which the test workpiece T is mounted and a securing unit 7 that secures the test workpiece T by friction by pressing the test workpiece T mounted on the mount surface 6a of the support body 6 against the support body 6.

Figure 2:
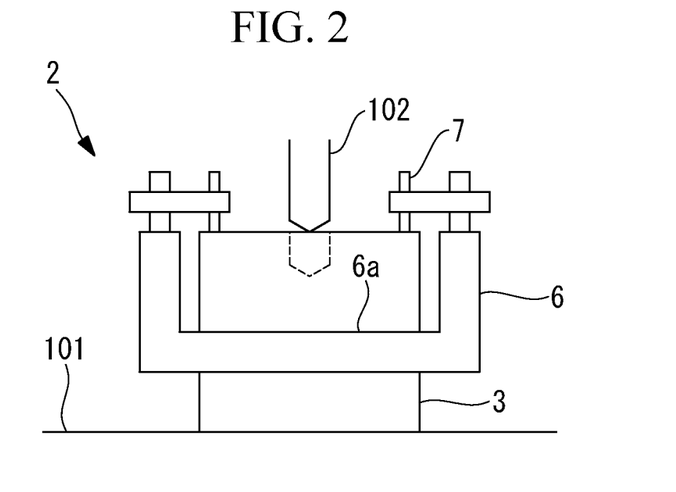
FIG. 2 is a front view illustrating a test-workpiece supporter included in the tool-life determination device in FIG. 1 and a test workpiece.

The load sensor 3 detects, for example, a vertical pressing force received by the test workpiece T from the cutting tool 102 during a cutting process performed on the test workpiece T by the cutting tool 102.

The storage unit 4 stores a temporal change of the pressing force detected by the load sensor 3 as a load pattern when the test workpiece T is cut in a state where a new cutting tool 102 is attached.

Figure 3:
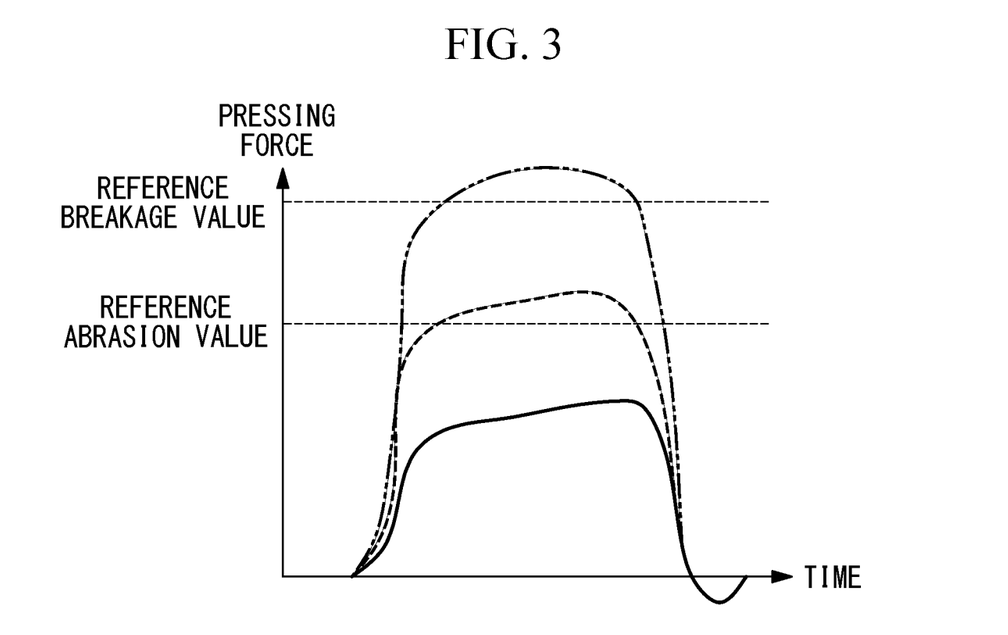
FIG. 3 illustrates an example of a load pattern detected by a load sensor in the tool-life determination device in FIG. 1.

The determination unit 5 sets reference values (i.e., a reference abrasion value and a reference breakage value in an example shown in FIG. 3) for the load pattern stored in the storage unit 4, determines that the cutting tool 102 has been excessively abraded and thus has a reduced life if the pressing force detected by the load sensor 3 exceeds the reference abrasion value, and determines that there is a high possibility that the cutting tool 102 may break if the pressing force exceeds the reference breakage value.

In a case where the reference abrasion value is, for example, 20% higher than the maximum value of the load pattern detected with respect to the new cutting tool 102 and the reference breakage value is, for example, 70% higher than the load pattern detected with respect to the new cutting tool 102, it is determined that the cutting edge is broken, or if there is no load applied, it is determined that the entire cutting tool is broken.

The abrasion determination process is performed by the determination unit 5 periodically in a predetermined cycle or at an appropriate timing when the workpiece W is being replaced upon completion of the cutting process.

The operation of the tool-life determination device 1 according to this embodiment having the above-described configuration will be described below.

Figure 4:
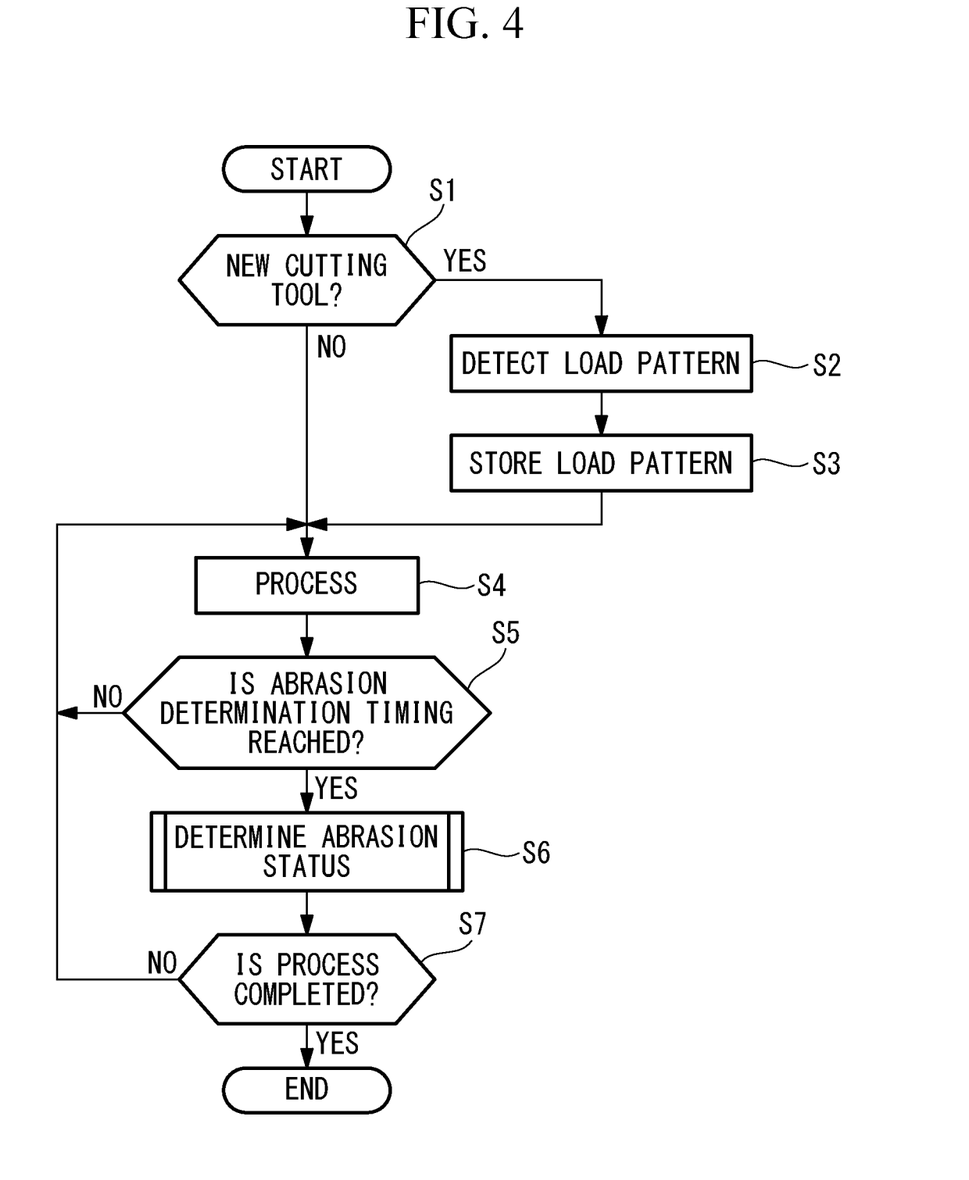
FIG. 4 is a flowchart illustrating a procedure for processing a workpiece by using the processing system in FIG. 1.

As shown in FIG. 4, in order to determine the life of the cutting tool 102 by using the tool-life determination device 1 according to this embodiment, it is first determined whether or not the cutting tool 102 is new (step S1). If the cutting tool 102 is new, a load pattern is detected by processing the test workpiece T (step S2), and the detected load pattern is stored in the storage unit 4 (step S3). In contrast, if it is determined in step S1 that the cutting tool 102 is not new, the process proceeds directly to step S4.

After the load pattern is stored, a cutting process is performed on an actual workpiece W by using the cutting tool 102 (step S4). Then, during the cutting process of the workpiece W, it is determined whether or not an abrasion determination timing is reached (step S5). If an abrasion determination timing is reached, an abrasion determination process is performed (step S6).

Figure 5:
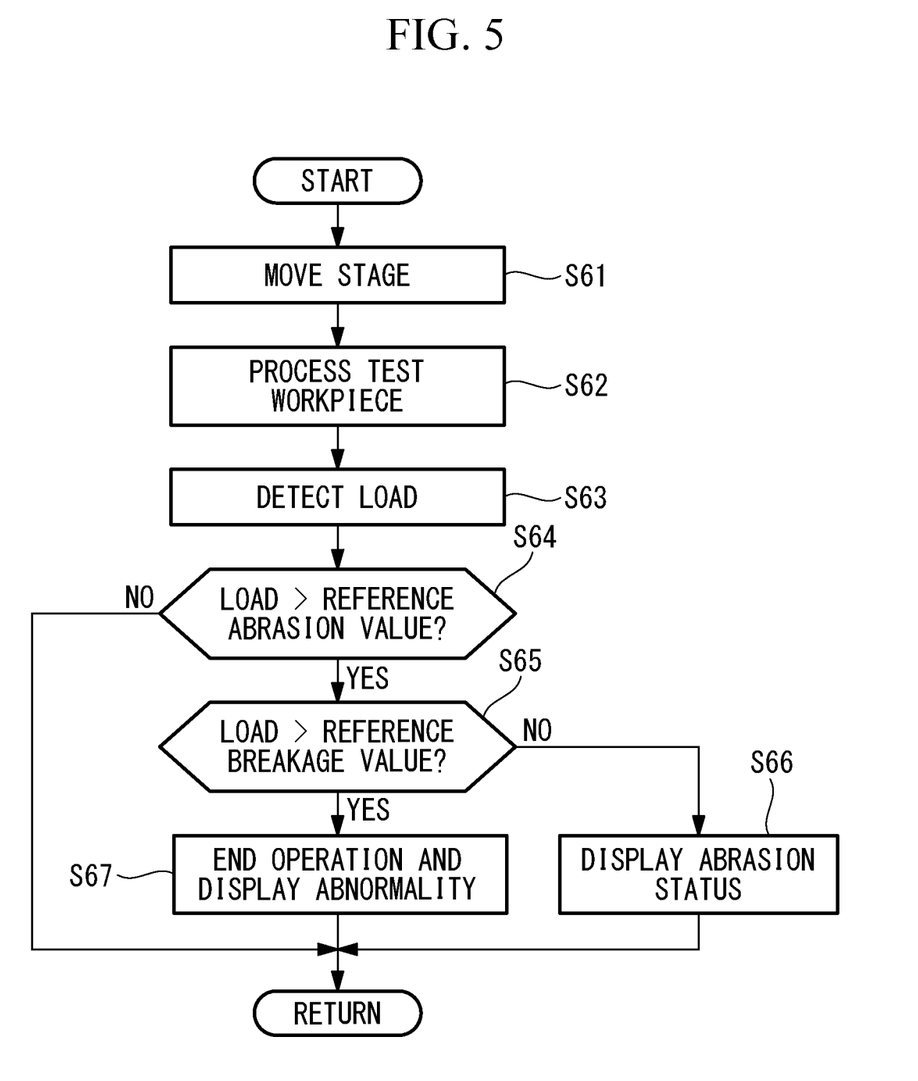
FIG. 5 is a flowchart illustrating an abrasion determination routine in the flowchart in FIG. 4.

As shown in FIG. 5, in the abrasion determination step S6, the stage 101 is actuated so that the test workpiece T supported by the test-workpiece supporter 2 is moved to a position where it is disposed vertically below the cutting tool 102 (step S61), and a cutting process is performed on the test workpiece T (step S62).

During the cutting process performed on the test workpiece T, the load sensor 3 detects a load applied to the test workpiece T from the cutting tool 102 (step S63), and the reference abrasion value set based on the load pattern stored in the storage unit 4 is compared with the magnitude of the detected load (step S64). If the determination unit 5 determines that the load detected by the load sensor 3 is higher than the reference abrasion value, it is further determined whether or not the load is higher than the reference breakage value (step S65).

If the load is lower than or equal to the reference breakage value in step S65, it is determined that the abrasion status is excessive, and a determination result is output to the controller 105 so as to cause the monitor 106 to display a message indicating such an excessive abrasion status (step S66). If the load is higher than the reference breakage value, it is determined that there is a risk of breakage of the cutting tool 102, and an operation end command and a determination result are output to the controller 105 so as to cause the monitor 106 to display a message indicating such a risk of breakage (step S67). The process then proceeds to step S7. The process similarly proceeds to step S7 if the load detected by the load sensor 3 is determined to be lower than or equal to the reference abrasion value in step S64.

Then, in step S7, it is determined whether or not the process is completed. If the process is not completed, the steps from step S4 and onward are repeated.

Accordingly, the tool-life determination device 1 according to this embodiment compares a reference value, which is set based on a load pattern detected by processing a test workpiece T when a new cutting tool 102 is attached, with a load detected when the same test workpiece T is processed at an appropriate timing after the process performed on a workpiece W, so as to determine the life of the cutting tool 102. Therefore, unlike a case where the load acting on the cutting tool 102 is detected during a process performed on the actual workpiece W, a fixed processing condition can be maintained. This is advantageous in that the accuracy for determining the abrasion status can be increased.

Furthermore, since the load sensor 3 is disposed at the test workpiece T side, which is relatively lightweight, instead of at the cutting tool 102 side, a change in the abrasion status can be accurately detected even if an inexpensive sensor with a small dynamic range is used as the load sensor 3. This is advantageous in that the tool life can be accurately determined.

As an alternative to this embodiment in which it is determined whether or not the abrasion status is excessive by comparing a single reference abrasion value with the load, a plurality of reference abrasion values may be prepared such that the abrasion status is determined in a stepwise fashion.

Moreover, as an alternative to the above-described setting example of the reference abrasion value and the reference breakage value, the reference values may be set to other freely-chosen values.

Figure 6:
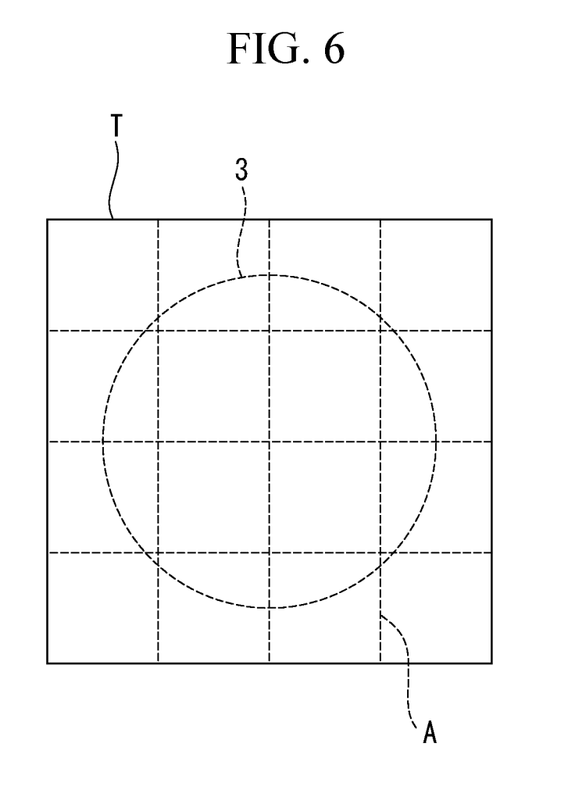
FIG. 6 is a plan view illustrating an example of how the test workpiece and the load sensor are arranged in the processing system in FIG. 1.

In this embodiment, the same test workpiece T is processed when a load pattern is acquired as a result of processing the test workpiece T by using a new cutting tool 102 and when a load is detected as a result of processing the test workpiece T by using a cutting tool 102 after processing a workpiece W. Alternatively, in order to obtain a fixed processing condition, different positions on the same surface of the same test workpiece T may be cut. For example, as shown in FIG. 6, the surface of the test workpiece T may be divided into a plurality of regions A, so that a different region A may be processed for each load detection process.

In this case, since each region A is disposed to have a different positional relationship with the load sensor 3 disposed at substantially the center of the test workpiece T, the determination unit 5 may be provided with a correction table that stores a correction coefficient, which is used for correcting the magnitude of load to be detected by the load sensor 3, in correspondence with each region A. Accordingly, every time a load is to be detected, an unprocessed surface of the test workpiece T can always be processed. This is advantageous in that matching processing conditions can be readily obtained and the accuracy for determining the abrasion status can be increased.

Figure 7:
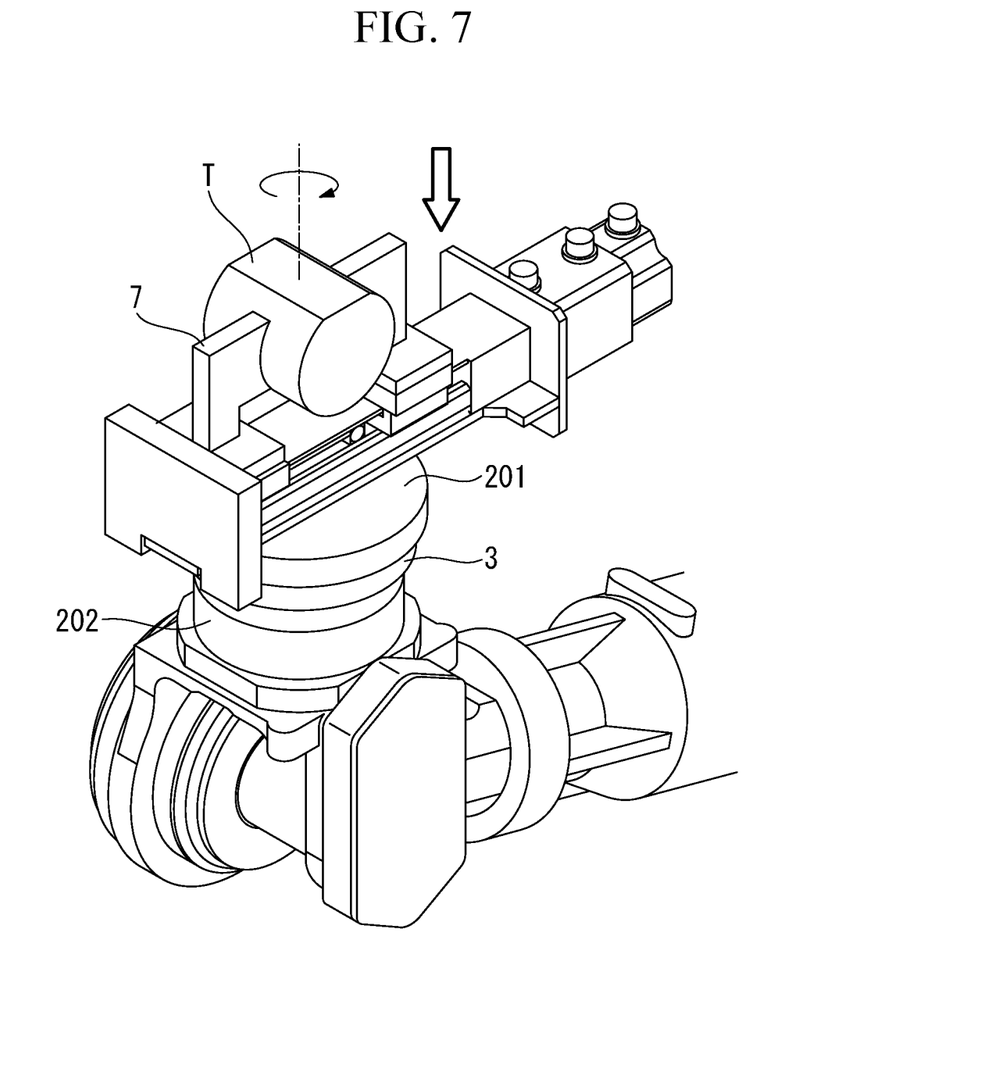
FIG. 7 shows a modification of the tool-life determination device in FIG. 1 and is a partial perspective view illustrating a case where the test-workpiece supporter is constituted of a robot.

In this embodiment, the test-workpiece supporter 2 for securing the test workpiece T is provided on the stage 101 that secures the workpiece W, so that the test workpiece T is disposed within a processable range of the cutting tool 102. Alternatively, as shown in FIG. 7, the test-workpiece supporter 2 may be constituted of a robot hand 201 attached to the distal end of a robot (working machine, base) 200. In the example shown in FIG. 7, the load sensor 3 may be disposed between the robot hand 201 and a wrist end 202.

Figure 8:
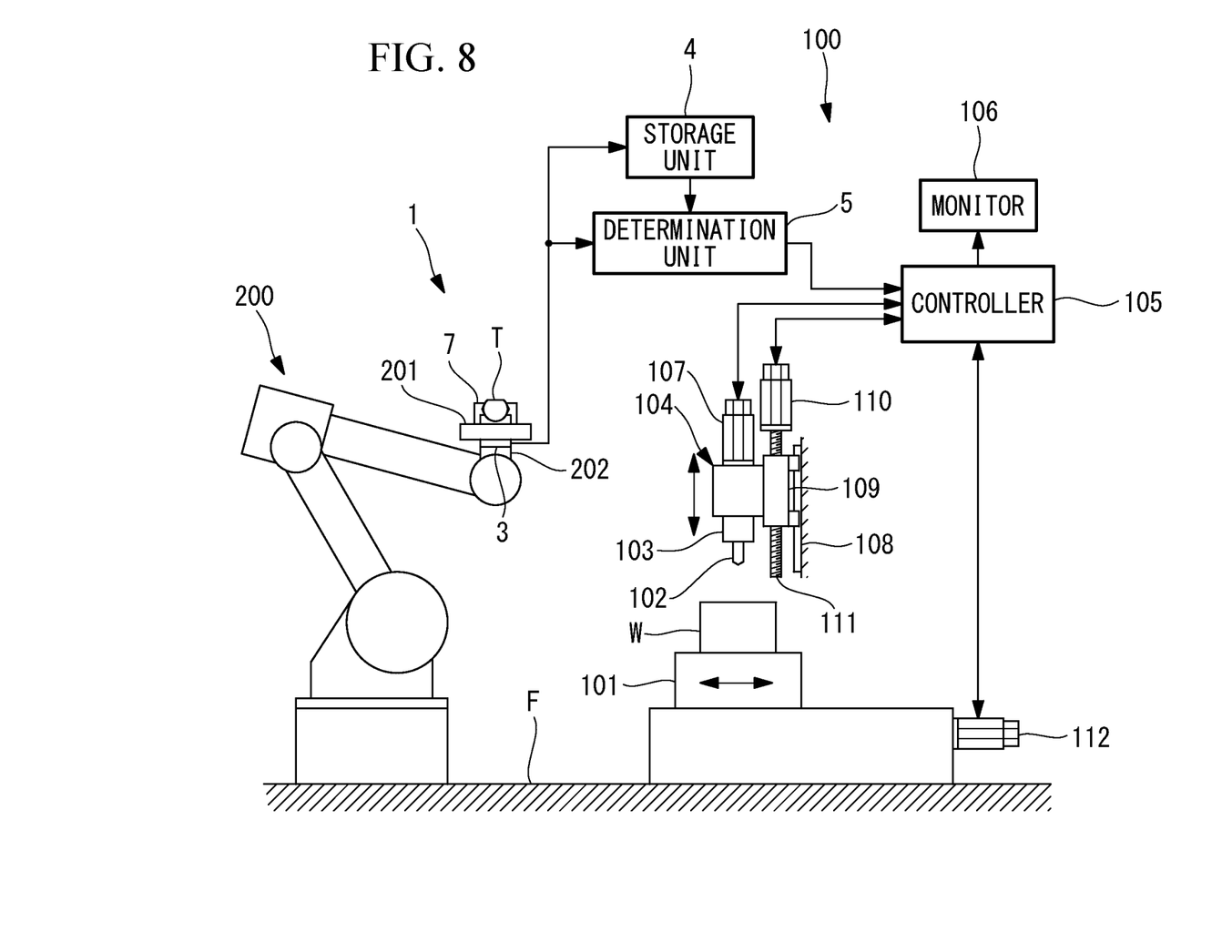
FIG. 8 is a block diagram illustrating an example of the processing system in FIG. 7.
Figure 9:
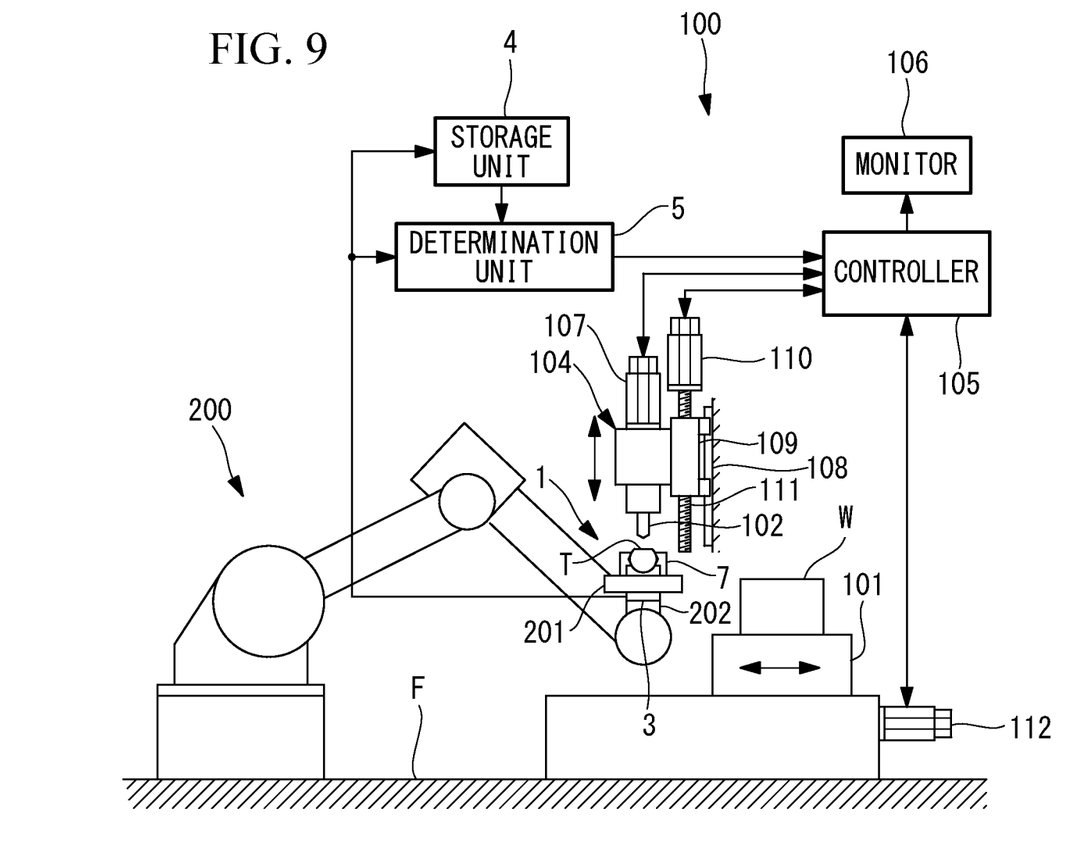
FIG. 9 is a block diagram illustrating a state where the robot sets the test workpiece within a processable range of a cutting tool in the processing system in FIG. 7.

Specifically, the test workpiece T may be withdrawn when the workpiece W is to be processed by using the cutting tool 102, as shown in FIG. 8, and the test workpiece T may be disposed within the processable range of the cutting tool 102 by actuating the robot 200 when the abrasion determination process is to be performed, as shown in FIG. 9. Consequently, advantages similar to those when the test-workpiece supporter 2 is disposed on the stage 101 can be achieved.

Figure 10:
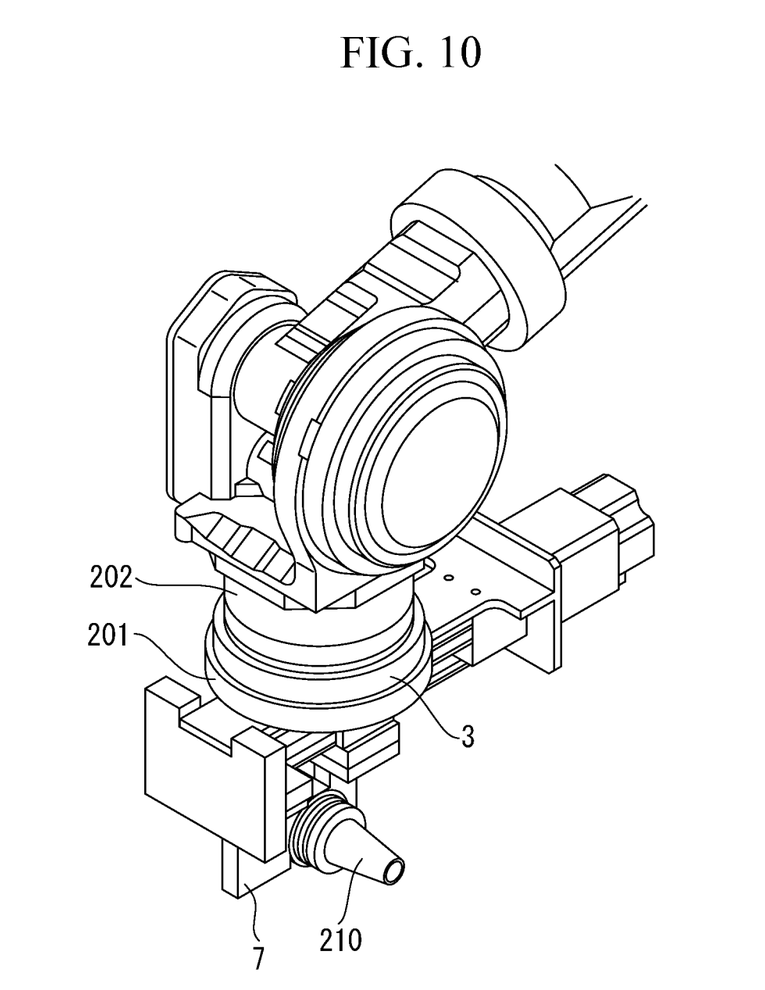
FIG. 10 is a partial perspective view illustrating a state where a tool is gripped by a robot hand in the processing system in FIG. 7.
Figure 11:
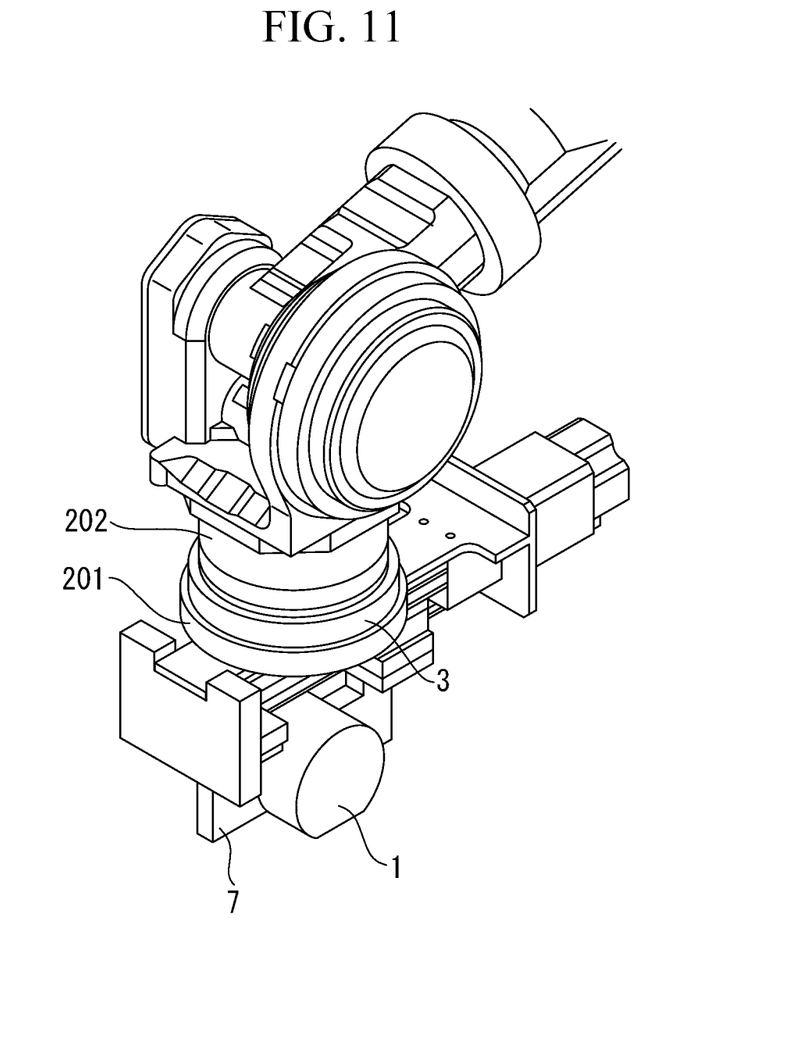
FIG. 11 is a partial perspective view illustrating a state where the test workpiece is gripped by the robot hand in the processing system in FIG. 7.

Furthermore, a robot for retrieving a tool 210 from a tool stocker (not shown) and for attaching the tool 210 to the working machine 100 may be used as the robot 200. In this case, as shown in FIGS. 10 and 11, the shape of the test workpiece T may be identical to the shape of a part of the tool 210 to be gripped by the robot hand 201. Thus, the robot 200 used for attaching a tool can be used as a robot for moving a test workpiece. The robot 200 is described as being a six-axis articulated robot but is not limited thereto.

Although a pressing force is detected as a load by the load sensor 3 in this embodiment, disturbance torque, the amplitude of vibrations, the acceleration of vibrations, or another arbitrary load may alternatively be detected.

As a result, the above-described embodiment leads to the following aspect.

An aspect of the present invention provides a tool-life determination device including: a test-workpiece supporter that has a cutting tool attached thereto, rotates the cutting tool, and supports a test workpiece disposed in a processable range of the cutting tool of a working machine that performs a process while changing a relative position between the cutting tool and a workpiece; a load sensor that is disposed between the test-workpiece supporter and a base of the working machine fixed to an installation surface and that detects a load acting on the test workpiece; a storage unit that stores a load pattern acting on the test workpiece and detected by the load sensor when the test workpiece is processed using a new cutting tool; and a determination unit that determines an abrasion status of the cutting tool by comparing the load pattern stored in the storage unit with the load acting on the test workpiece and detected by the load sensor at an appropriate timing during an actual process performed on the workpiece.

According to this aspect, when a new cutting tool is attached, the cutting tool is first positioned to the test workpiece disposed within the processable range, the test workpiece is subsequently processed under a predetermined processing condition, and the load pattern acting on the test workpiece and detected by the load sensor at that time is stored in the storage unit. Then, when the actual workpiece is to be processed by using the same cutting tool, the cutting tool is positioned to the test workpiece at an appropriate timing, the test workpiece is subsequently processed under the same processing condition as the first time, and the load at that time is detected by the load sensor. The determination unit determines the abrasion status of the cutting tool by comparing the detected load with the load pattern with respect to the new cutting tool stored in the storage unit.

Specifically, according to this aspect, the load acting on the cutting tool during a process performed on the actual workpiece is not detected but is instead compared with the load acting on the test workpiece by which a fixed processing condition can be maintained, so that the accuracy for determining the abrasion status can be increased. Moreover, the load sensor is disposed at the test workpiece side, which is relatively lightweight, instead of at the cutting tool side, so that a change in the abrasion status can be accurately detected even if an inexpensive sensor with a small dynamic range is used as the load sensor. This is advantageous in that the tool life can be accurately determined.

In the above-described aspect, the base may be a stage of the working machine for securing the workpiece, and the stage may be moved relative to the cutting tool so as to change the relative position between the cutting tool and the workpiece and also to dispose the test workpiece within the processable range.

Accordingly, the test-workpiece supporter is secured, via the load sensor, to a part of the stage, which is for securing the workpiece, provided in the working machine, so that the cutting tool can be quickly positioned to the workpiece or the test workpiece by moving the cutting tool and the stage relatively to each other. Consequently, the test workpiece can be quickly processed at an appropriate timing during a process performed on the workpiece, so that the tool life can be accurately determined.

Furthermore, in the above-described aspect, the base may be a robot whose distal end supports the test-workpiece supporter, and the robot may be moved relative to the cutting tool so as to dispose the test workpiece within the processable range.

Accordingly, the robot having the test workpiece attached to the test-workpiece supporter supported at the distal end is actuated, so that the test workpiece is disposed within the processable range of the cutting tool, whereby the test workpiece can be processed by using the cutting tool. The stage to which the workpiece is to be attached does not have to be provided with an extra stroke for the test workpiece.

Furthermore, in the above-described aspect, the test workpiece may include a plurality of regions with which the cutting tool is contactable under identical processing conditions, and the determination unit may include a correction table for correcting the load detected by the load sensor in accordance with each region.

Accordingly, the abrasion status can be determined multiple times without replacing the test workpiece during a process performed on the workpiece by using the cutting tool. Even if the load pattern detected by the load sensor changes as a result of processing different regions of the same test workpiece, the load detected for each region is corrected based on the correction table, so that the abrasion status can be determined based on a fixed criterion. Moreover, since the test workpiece is not replaced during a process performed on the workpiece, the processing condition with respect to the test workpiece can be prevented from fluctuating, so that the determination accuracy can be increased.

The present invention is advantageous in that it can accurately determine the abrasion status of a cutting tool by using an inexpensive sensor.

The invention claimed is:

1. A tool-life determination device comprising:
   a test-workpiece supporter that can support a test workpiece;
   a load sensor that is disposed between the test-workpiece supporter and a base of a working machine and that can detect a load acting on the test workpiece when the test workpiece is processed using a cutting tool of the working machine;
   a storage unit that stores a load pattern acting on the test workpiece and detected by the load sensor when the test workpiece is processed using a new cutting tool; and
   a determination unit that determines an abrasion status of the cutting tool or a possibility that the cutting tool may break by obtaining a reference abrasion value and a reference breakage value based on the load pattern stored in the storage unit, and comparing the reference abrasion value and the reference breakage value with the load acting on the test workpiece and detected by the load sensor at an appropriate timing during an actual process performed on a workpiece; wherein
   the determination unit outputs a determination result indicating an excessive abrasion status of the cutting tool if the load acting on the test workpiece is higher than the reference abrasion value and lower than the reference breakage value, and outputs a processing operation end command if the load acting on the test workpiece is higher than the reference breakage value.

2. The tool-life determination device according to claim 1,
   wherein the base is a stage of the working machine for securing the workpiece, and
   wherein the stage is moved relative to the cutting tool so as to change the relative position between the cutting tool and the workpiece and also to dispose the test workpiece within the processable range.

3. The tool-life determination device according to claim 1,
   wherein the base is a robot whose distal end supports the test-workpiece supporter, and
   wherein the robot is moved relative to the cutting tool so as to dispose the test workpiece within the processable range.

4. The tool-life determination device according to claim 1,
   wherein the test workpiece includes a plurality of regions with which the cutting tool is contactable under identical processing conditions, and
   wherein the determination unit includes a correction table for correcting the load detected by the load sensor in accordance with each region.

* * * * *